United States Patent [19]

Murschall et al.

[11] Patent Number: 4,743,746

[45] Date of Patent: May 10, 1988

[54] RECEIVING UNIT FOR A DATA CARD CONTAINING AN ELECTRONIC CIRCUIT

[75] Inventors: Werner Murschall, Leopoldshoehe; Gerd Neumann, Paderborn, both of Fed. Rep. of Germany

[73] Assignee: Nixdorf Computer AG, Paderborn, Fed. Rep. of Germany

[21] Appl. No.: 799,121

[22] Filed: Nov. 18, 1985

[30] Foreign Application Priority Data

Dec. 11, 1984 [DE] Fed. Rep. of Germany ....... 3445185

[51] Int. Cl.⁴ .................................................. G06K 7/00
[52] U.S. Cl. .................................... 235/486; 235/441; 235/485
[58] Field of Search ............... 235/483, 486, 485, 441; 339/75 MC

[56] References Cited

U.S. PATENT DOCUMENTS

| | | | |
|---|---|---|---|
| 3,511,975 | 5/1970 | Blair et al. | 235/486 X |
| 3,883,856 | 5/1975 | Saito et al. | 235/441 X |
| 4,084,874 | 4/1978 | Georgopulos | 339/75 MP |
| 4,404,464 | 9/1983 | Moreno | 235/441 X |

FOREIGN PATENT DOCUMENTS

| | | |
|---|---|---|
| 0041261 | 12/1981 | European Pat. Off. . |
| 2705534 | 6/1978 | Fed. Rep. of Germany . |
| 3326522 | 1/1984 | Fed. Rep. of Germany . |
| 3235654 | 3/1984 | Fed. Rep. of Germany . |
| 3313356 | 10/1984 | Fed. Rep. of Germany . |
| 2492213 | 4/1982 | France . |
| 2124420 | 2/1984 | United Kingdom . |

Primary Examiner—David L. Trafton
Attorney, Agent, or Firm—Cullen, Sloman, Cantor, Grauer, Scott & Rutherford

[57] ABSTRACT

The receiving unit for a data card (10) containing an electronic circuit includes a push-in frame showing a receiving compartment (20) for the data card (10) which frame is pivotable between an input/output position and an operating position in which the receiving compartment (20) is inaccessible, and locking means for fixing the push-in frame in the operating position, where the push-in frame is under initial stress in its input/output position and is arranged behind a case wall (14) of the receiving compartment (20) of the receiving unit in such a way that the receiving compartment (20) in its input/output position is in alignment with an input/output slot (16) in the housing wall (14). The locking means include an elastically deflectable restoring unit (32; 54,60), which puts the pushed-in data card (10) under initial stress counter to the push-in direction, and at least one catch projection (34) which is arranged fixed on the case in the region of the input/output slot (16) in such a way that it overlaps the edge of the data card (10) turned toward the input/output slot in the operating position of the push-in frame.

5 Claims, 3 Drawing Sheets

RECEIVING UNIT FOR A DATA CARD CONTAINING AN ELECTRONIC CIRCUIT

FIELD OF THE INVENTION

The invention relates to a receiving unit for a data card containing an electronic circuit for an apparatus to be put into operation by means of the data card the receiving unit includes a push-in frame having a receiving compartment for the data card. The frame is pivotable between an input/output position and an operating position in which the receiving compartment is inaccessible and in which contact elements of the receiving unit, through an opening in the push-in frame, rest against contact elements of the pushed-in data card. The combination includes locking means for fixing the push-in frame in its operating position, where the push-in frame is under initial stress in its input/output position.

BACKGROUND OF THE INVENTION

A receiving unit as generally described above is disclosed, for example, in English Pat. No. A1-41261. In the solution described there the push-in frame is swung out of the front plate of the apparatus into its input/output position, so that an input/output slot for inserting or removing the card is unblocked. In the operating position, on the contrary, the push-in frame is swung in in such a way that its one side is fully aligned with the front plate of the apparatus and the input/output slot is covered. For fixing the push-in frame in its operating position a relatively complicated mechanical locking mechanism is used which can be released from the outside by pressure on a button so that the push-in frame is conveyed into its input/output position under the action of a prestressing spring.

SUMMARY OF THE INVENTION

The invention is based on the problem of supplying a receiving unit of the type mentioned at the start which is simple in its construction, economical in its production and simple to operate.

This problem is solved according to the invention by having the push-in frame arranged behind a case wall of the receiving unit in such a way that the receiving compartment in its input/output position is aligned with an input/output slot in the case wall and in that the locking means include an elastically deflectable restoring unit which is arranged in the region of the end of the receiving compartment which is away from the input/output slot and puts the pushed-in data card under initial stress counter to the push-in direction, and at least one catch projection which is arranged on the case in the region of the input/output slot in such a way that it overlaps the edge of the data card turned toward the input/output slot in the operating position of the push-in frame.

In the solution according to the invention the expensive locking mechanism known from the state of the art is eliminated. The pushed-in data card itself serves for locking the push-in frame in its operating position. The locking can be released by forcing the card into the receiving compartment counter to the force exerted by the restoring unit, so that it can be guided along on the catching projection when the push-in frame is pivoted into its input/output position under the action of a prestressing spring. In order conveniently to be able to reach the data card, which normally is in its operating position behind the case wall showing the input/output slot, when the locking is released, it is suitable for the case wall to show a recess in the form of a gripping depression through which the input/output slot runs and into which the data card protrudes in the operating position.

In a particularly simple embodiment of the invention the restoring unit can be made of pressure springs which are arranged in the push-in frame in such a way that they protrude into the receiving compartment and act on the edge of the pushed-in data card which is away from the input/output slot. A movable bottom can be provided in the receiving compartment which bottom is acted on by the pressure springs and in turn rests against the impacted edge of the pushed-in data card.

In a preferred embodiment of the invention the restoring unit includes a rocking lever with a carrier projecting into the receiving compartment which carrier is intended to lie against a striking edge of the push-in data card and is under initial stress counter to the push-in direction. The carrier here may either lie against the edge of the data card which is forward in the insertion direction or else for example may catch in notches on the side edges of the data card.

The receiving unit may be made as an assembly carrier which can be inserted into a rack or a compartment in the apparatus which is to be put into operation by the data card. For this push-in frame is fastened onto a circuit board carrying a circuit arrangement which in connection with the circuit arrangement of the data card generates the signals required for controlling the apparatus.

In spite of its simple construction the receiving unit according to the invention offers at least the same security against fraudulent manipulation as the known receiving unit described at the start.

Further features and advantages of the invention are shown by the following description, which in connection with the annexed drawings explains the invention on the basis of two embodiment examples. In these:

DETAILED DESCRIPTION OF ILLUSTRATIVE EMBODIMENTS

Figure 1:
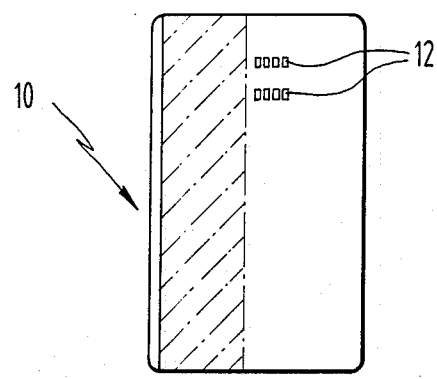
FIG. 1 shows a top plan view of a data card with an integrated circuit contained in the data card.

In FIG. 1 is seen a data card designated in general as 10 which contains an electronic circuit arrangement in the form of an integrated circuit, not represented. Its inputs and outputs are connected with contact elements 12 which are arranged on the surface of the data card 10. By way of these contact elements in a receiving unit which are connected with an apparatus to be put into operation by the data card. The contact elements 12 may also be arranged in other places, for example, along the edges of the data card, depending on the construction of the receiving unit. The field of the data card hatched with dot-dash lines in FIG. 1 may, for example, be provided with imprints.

Figure 4:
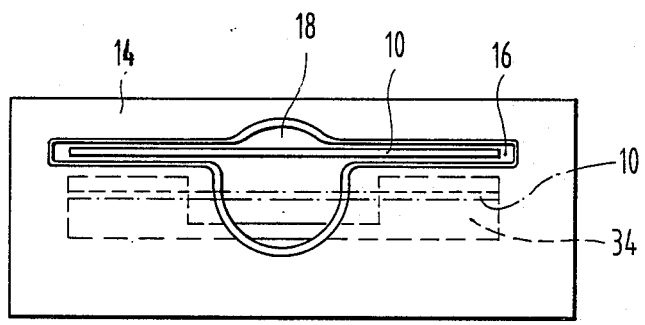
FIG. 4 shows a front view of the receiving unit in the direction of the arrow A in FIG. 2.
Figure 2:
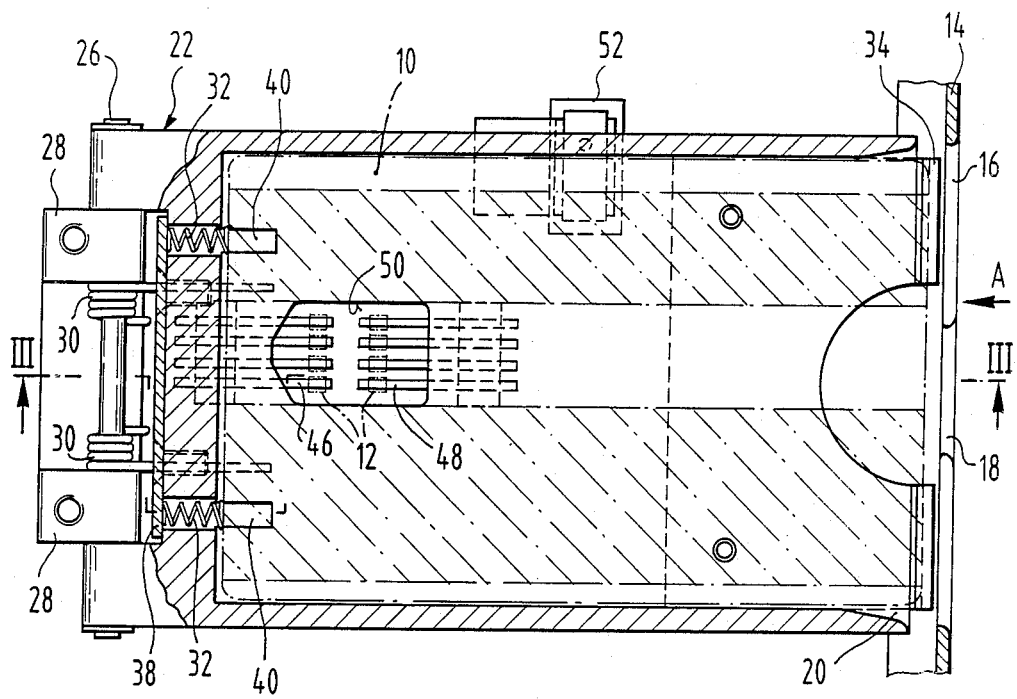
FIG. 2 shows a top plan view of the push-in frame with a pushed-in data card.
Figure 3:
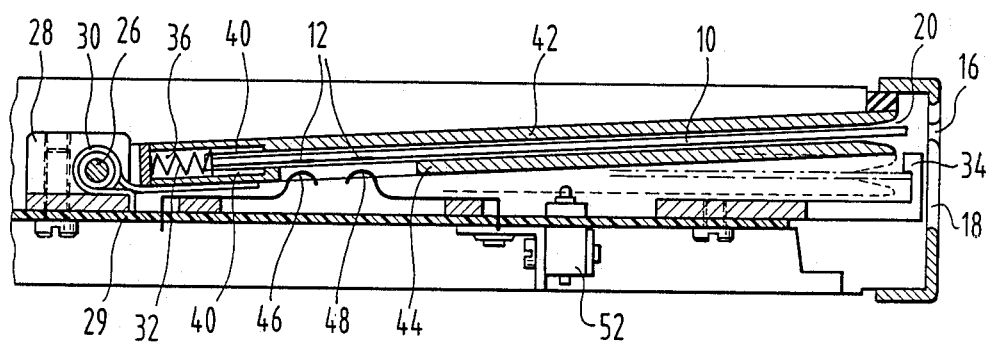
FIG. 3 shows a section along line 3—3 in FIG. 2.

In FIGS. 2-4 is represented the unit intended for receiving the data card 10 according to a first embodiment of the invention. It is made in the form of an assembly carrier for electronic components which can be pushed into a rack or compartment of an apparatus to be put into operation by the data card 10. In FIG. 4 there is a view of the front wall 14 of the frame, not otherwise represented, of this assembly carrier. In the front wall 14 an input/output slot 16 is formed for the data card 10. In the central segment of the input/output slot 21 the front wall 14 shows a trough-like recess 18 within which the input/output slot 16 is widened in such a way that the data card 10 can be grasped with the hand in both of its possible positions, as will later be described in detail.

The data card 10 can be pushed in through an input/output slot 16 into the receiving compartment 20 of a push-in frame designated in general as 22, which frame is pivoted by its end away from the front wall 14 around a pivot pin 26 parallel to the front wall 14 between an input/output position and an operating position, pivoted on a bearing bracket 28 which in turn is fastened onto a circuit board 29 joined with the frame of the assembly carrier or of the receiving unit. The push-in frame 22 is under initial pressure by means of torsion springs 30 in its input/output position in which the receiving compartment 20 is in alignment with the input/output slot 16. The torsion springs 30 here rest by their one respective end on the bearing bracket 28 and by their other respective end on the push-in frame 22. The push-in frame 22 can be forced downward in FIGS. 3 and 4 counter to the initial stress of these torsion springs 30 so that it assumes the position reproduced by broken lines in FIG. 3, in which the receiving compartment 20 is inaccessible.

In order to fix the push-in frame 22 in its operating position, pressure springs 32 are provided in the push-in frame 22 near the end of the push-in compartment 20 away from the front wall 14, which springs force the pushed-in data card 10 in the direction of the front wall 14 so that after the pivoting of the push-in frame 22 it catches by its edge turned toward the front wall 14 against a catch strip 34 nose-shaped in cross section, as is represented in broken lines in FIG. 3. The pressure springs 32 here are guided in bores 36 in the push-in frame 22, are supported by their ends on a strip 38 screwed onto the push-in frame 22 and protrude by their free ends into the push-in frame 20, where they are guided in partially cylindrical recesses 40 inside the bottom and cover surfaces 42 and 44, respectively, delimiting the push-in compartment 20.

In the operating position of the push-in frame 22, the contact elements 12 of the data card 10 lie against contact springs 46,48 which are fastened under the push-in frame 22 onto the circuit board 29 of the receiving unit. The circuit board 29 carries the interpreting or control circuit arrangement of the data card 10 generates control signals for controlling the apparatus which is to be put into operation by the data card 10. The contact springs 46,48 here grip through an opening 50 in the bottom 44 of the push-in frame 22. At the same time the push-in frame 22 in its operating position acts on a microswitch 52, which ensures that the electrical apparatus to be controlled by the data card 10 is put into operation only when the data card 10 is pushed into the receiving compartment 20 and the push-in frame 22 is locked in its operating position. As is seen from this, a locking of the push-in frame 22 is possible only when the data card 10 is pushed into the receiving compartment 20, since it is required for the locking itself. A further advantage of the design according to the invention consists in that the data card when it catches behind the catch strip 34 is pushed along on the contract spring 46, so that the latter slide on the contact elements 12. Due to this sliding of the contact springs 46,48 on the contact elements 12 is made between the contact elements lying against one another.

The push-in frame 22 is unlocked in a simple manner by forcing the data card 10 again into the receiving compartment 20 so that it comes free from the catch strip 34 and thereby the push-in frame 22 is pivoted by the torion springs into its input/output position in which the data card 10 can be pulled out of the receiving compartment 20.

Figure 5:
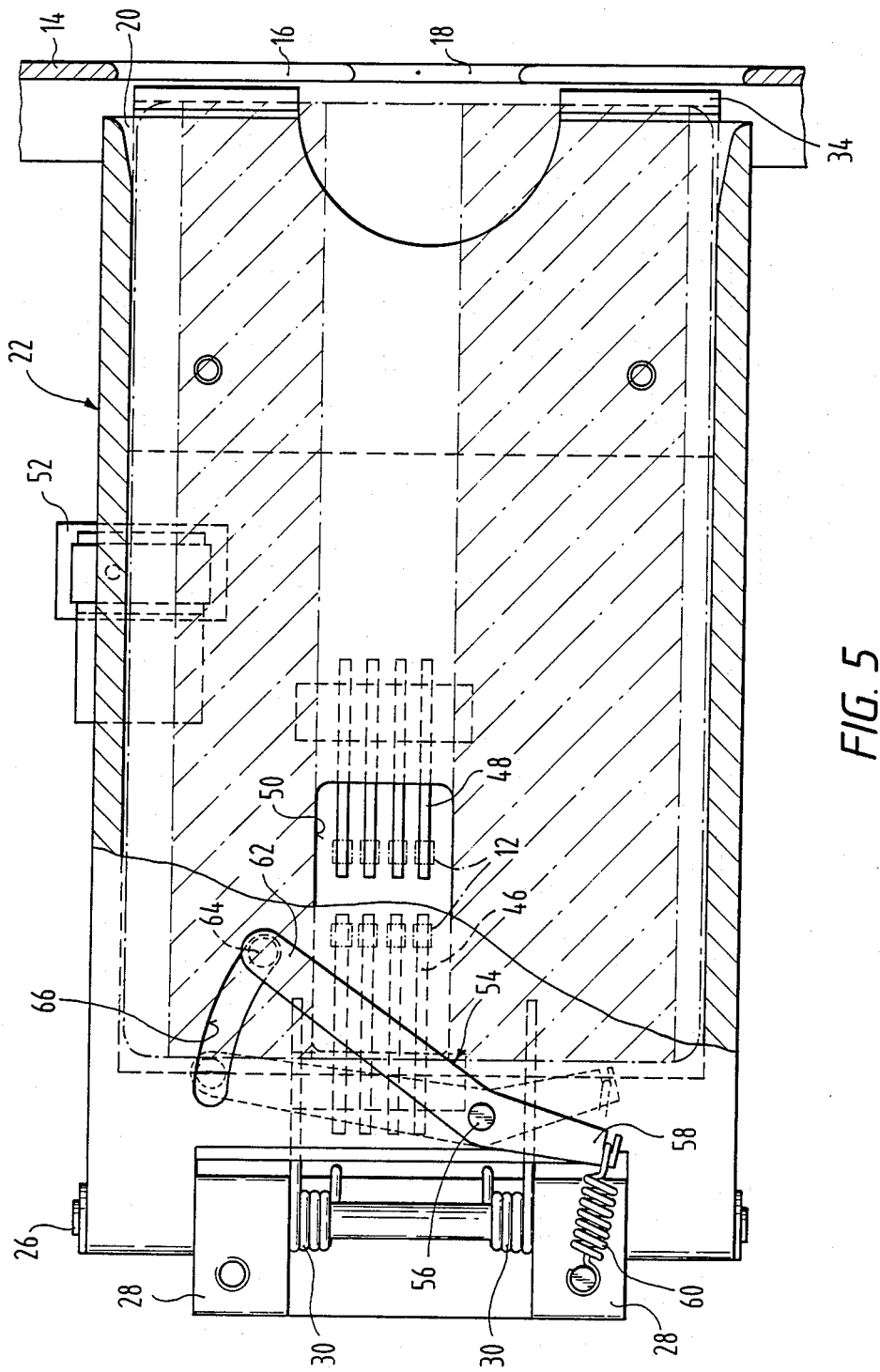
FIG. 5 shows a top plan view corresponding to FIG. 2 of a push-in frame according to a second embodiment of the invention.

The embodiment according to FIG. 5 differs from that of FIGS. 2 to 4 only in the type of restoring means which push the data card 10 in the direction of the front wall 14. Therefore the same parts are again provided with the same reference numbers.

The restoring means include a two-armed lever 54 which is mounted on the push-in frame 22 so as to be pivotable around a pivot 26 and to the push-in direction of the data card 10. A tension spring 60 acts on the shorter arm 48 of the two-armed lever 54, which spring is fastened by its other end to the bearing bracket 28. At the free end of the longer lever arm 62 of the two-armed lever 54 is provided a carrier 64 which engages in the receiving compartment 20 through a curved slot 66 made in the top surface 42 of the push-in frame 22. If a data card 10 is pushed into the receiving compartment 20, then it strikes against the carrier 64 and pivots the double-armed lever 54 counter to the action of the tension spring 60 into the position drawn in broken lines in FIG. 5. When the push-in frame 22 is then forced into its operating position, the initial stress of the double-armed lever 54 causes the data card 10 to be moved in the direction of the front wall 14 and thereby caught behind the catch strip 34, so that the push-in frame 22 is held in its operating position. The remaining parts and functions of the receiving unit according to FIG. 5 agree with those of the embodiment described on the basis of FIGS. 2 to 4.

What is claimed is:

1. Receiving unit for receipt of a data card containing an electronic circuit for an apparatus to be put into operation by means of the data card, said receiving unit having a push-in frame with a receiving compartment therein for the data card, said frame being pivotable between an input/output position and an operating position in which the receiving compartment is inaccessible and in which contact elements of the receiving unit, through an opening in the push-in frame, rest against contact elements of the data card, locking means for fixing the push-in frame in its operating position and biasing means for biasing the push-in frame to the input/out position; said receiving unit comprising:

a face plate having an input/output slot therein for receipt and discharge of said data card, said push-in frame being positioned behind said face plate with said receiving compartment aligned with said input/output slot when said push-in frame is in the input/output position so that said card can be inserted into said push-in frame through said input/output slot;

an elastically deflectable restoring unit arranged in said receiving compartment opposite said face plate biasing said data card in the direction of said face plate;

a catch projection fixed to said face plate a spaced distance from said input/output slot, said catch projection overlapping said data card when said push-in frame is pivoted to said operating position to retain said data card in said operating position, said elastically deflectable restoring unit biasing said data card under said catch projection to maintain said overlap for keeping said data card in said operating position;

an opening in said face plate extending through said face plate and catch projection, said opening being adjacent said data card when said push-in frame and data card are in said operating position, said data card being accessible through said opening to be pushed against said elastically deflectable restoring unit to move said data card away from said catch projection to thereby release said data card and said push-in frame being biased to said input/output position, said elastically deformable restoring unit biasing said data card into said input/output slot upon reaching said input/output position.

2. Receiving unit as claimed in claim 1, characterized in that the restoring unit is formed of pressure springs (32) which are arranged in the push-in frame (22) in such a way that they protrude into the receiving compartment (20) and act on the edge of the pushed-in data card (10) which is away from the input/output slot (16).

3. Receiving unit as claimed in claim 1, characterized in that the restoring unit includes a rocking lever (54) with a carrier (64) protruding into the receiving compartment (20) which is intended to lie against a striking edge of the pushed-in data card (10) and is under initial stress counter to the push-in direction.

4. Receiving unit as claimed in claim 1, characterized in that the catch projection is formed by a catch strip (34) arranged parallel to the input/output slot (16) on the inside of the case wall (14).

5. Receiving unit as claimed in claim 1, characterized in that the push-in frame (22) is fastened onto a circuit board (29) which carries an interpreting and control circuit which in connection with the circuit arrangement of the data care (10) generates signals for the control of the apparatus to be put into operation by the data card (10), and in that the circuit board is fastened onto a supporting frame (14) which can be pushed into a rack or receptacle of the apparatus.

* * * * *